United States Patent [19]

Heeb et al.

[11] Patent Number: 5,749,092
[45] Date of Patent: May 5, 1998

[54] METHOD AND APPARATUS FOR USING A DIRECT MEMORY ACCESS UNIT AND A DATA CACHE UNIT IN A MICROPROCESSOR

[75] Inventors: Jay Heeb, Gilbert, Ariz.; Sunil Shenoy; Jimmy Wong, both of Portland, Oreg.

[73] Assignee: Intel Corporation, Santa Clara, Calif.

[21] Appl. No.: 789,455

[22] Filed: Jan. 27, 1997

Related U.S. Application Data

[63] Continuation of Ser. No. 619,959, Mar. 20, 1996, abandoned, which is a continuation of Ser. No. 32,968, Mar. 18, 1993, abandoned.

[51] Int. Cl.$^6$ ............................................. G06F 12/08
[52] U.S. Cl. ......................... 711/138; 711/144; 395/842
[58] Field of Search ............................... 395/465, 466, 395/471, 842, 843, 844, 845, 846, 847, 848

[56] References Cited

U.S. PATENT DOCUMENTS

| | | | |
|---|---|---|---|
| 5,091,580 | 2/1992 | Culley | 711/3 |
| 5,247,643 | 9/1993 | Shottan | 711/143 |
| 5,247,648 | 9/1993 | Watkins et al. | 711/143 |
| 5,265,235 | 11/1993 | Sindhu et al. | 711/120 |
| 5,301,287 | 4/1994 | Herrell et al. | 711/202 |
| 5,325,503 | 6/1994 | Stevens et al. | 711/146 |
| 5,379,402 | 1/1995 | Fujihara et al. | 711/141 |
| 5,408,636 | 4/1995 | Santeler et al. | 711/163 |
| 5,410,654 | 4/1995 | Foster et al. | 711/147 |
| 5,517,626 | 5/1996 | Archer et al. | 711/118 |

Primary Examiner—Eddie P. Chan
Assistant Examiner—Reginald G. Bragdon
Attorney, Agent, or Firm—Blakely, Sokoloff, Taylor & Zafman

[57] ABSTRACT

A microprocessor and method which allows data consistency to be maintained between a memory which is external to the microprocessor and a data cache unit. The microprocessor has a central processing unit coupled to a local bus. A direct memory access unit coupled to the central processing unit for loading data from and storing data to the direct access memory unit. The local bus is coupled to a system bus and has a bus control unit controlling the loading and storing of data on the system bus. The system bus transfers data external to the microprocessor using the bus control unit upon instructions from the central processing unit. A data cache unit is coupled to the local bus and selectively stores a copy of data loaded by the bus control unit and receives a memory address from the local bus during a memory access by either the central processing unit or the direct memory access unit. The microprocessor employs a mechanism that invalidates copy data when the memory access is a store by the direct memory access unit when a cache hit is detected. Further, the microprocessor employs a mechanism that designates as non-cacheable the loading of data by the direct access memory unit, even though the data was previously designated as cachable, preventing the data cache unit from performing any action, namely the overwriting of more critical data within the data cache unit.

17 Claims, 5 Drawing Sheets

METHOD AND APPARATUS FOR USING A DIRECT MEMORY ACCESS UNIT AND A DATA CACHE UNIT IN A MICROPROCESSOR

This is a continuation of application Ser. No. 08/619,959 filed Mar. 20, 1996, now abandoned, which is a continuation of application Ser. No. 08/032,968, filed Mar. 18, 1993, now abandoned.

BACKGROUND OF THE INVENTION

1. Field of the Invention

The present invention relates generally to the field of microprocessors and more specifically to microprocessors having both a direct memory access unit and a data cache memory unit.

2. Prior Art

Figure 1:
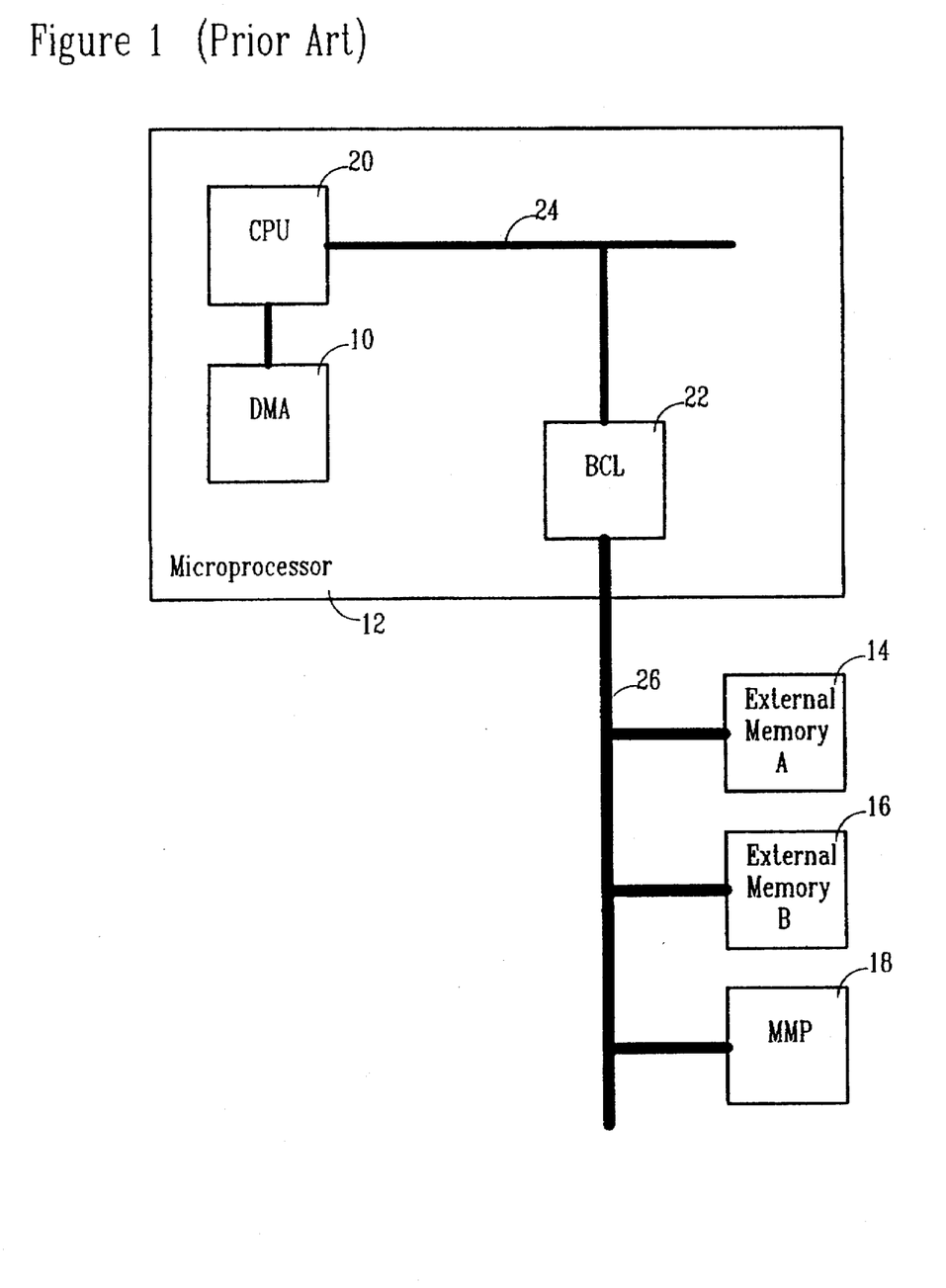
FIG. 1 is an illustration of a prior art system employing a microprocessor having a direct memory access unit and a bus control unit as implemented in a system with external memory and a memory mapped peripheral.

FIG. 1 illustrates a prior art system having a microprocessor 12 that utilizes a direct memory access unit (DMA) 10 to perform the specialized function of transferring data between an external memory A 14, an external memory B 16, and a memory-mapped peripheral (MMP) 18. Direct memory access unit 10 is coupled to central processing unit 20 to provide microprocessor 12 with high performance programmable data transfer capabilities. Microprocessor 12 also comprises a central processing unit (CPU) 20, a bus control unit (BCL) 22, a local bus 24 and a system bus 26. Central processing unit 20 and bus control unit 22 are coupled to local bus 24. Bus control unit 22, external memory A 14, external memory B 18, and memory-mapped peripheral 18 are coupled to system bus 26.

During a typical transfer of data from memory mapped peripheral 18 to external memory A 14, direct memory access unit 10 initiates the transfer cycle by signaling central processing unit 20 for data transfer. Central processing unit 20 subsequently issues the appropriate instructions to bus control unit 22. Direct memory access unit 10 controls data transfer by first using bus control unit 22 to retrieve piecewise the block of data from memory mapped peripheral 18 and subsequently, to store the data in external memory A 14. All data transfers external to microprocessor 12 are accomplished via system bus 26.

It is also known in the art for microprocessors to use an on-chip data cache unit (DCU) to circumvent the long access times to external memories, thereby enhancing the performance of the microprocessor. A data cache unit is used to store a copy of the data used by the central processing unit such that when the data is needed again, the central processing unit can rapidly retrieve the copy of the data from the data cache unit instead of waiting for a slow external memory to deliver the data. In this manner, a data cache unit can significantly improve the performance of a microprocessor.

A direct memory access unit and a data cache unit each individually enhance microprocessor performance in distinct ways. A direct memory access unit automates control of data transfers. A data cache unit improves microprocessor performance by circumventing long access times to data stored in external memory. Therefore, overall microprocessor and system performance would be enhanced by implementing both in a microprocessor. However, problems of "thrashing" and cache coherency have prevented implementation of both a direct memory access unit and a data cache unit together on the same microprocessor.

Thrashing of the data cache unit is a condition where the data stored in the data cache unit is substantially overwritten with data that is unlikely to be used by the central processing unit. Thrashing of the data cache unit is a particular problem when using a direct memory access unit because blocks of data accessed during a direct memory transfer are stored in the data cache unit. Since DMA data is rarely used by the microprocessor right away, other previously stored data in the cache unit is needlessly replaced. Thrashing of the cache by the direct memory access unit, therefore, reduces the microprocessor and system performance gains of using a data cache unit.

Another problem that is of central concern in a microprocessor or system using a data cache unit is the coherency between the copy of the data in the data cache unit and the original data in external memory. In other words, there must be no difference if the central processing unit retrieves copy data from the data cache unit instead of the original data from external memory. The cache coherency problem is simply that of insuring that original data in the external memory is not different than the corresponding copy data in the data cache unit.

To avoid thrashing of the data cache, the direct memory access unit is given access to external memory independent of the data cache unit. In other words, the direct memory access unit "bypasses" the data cache unit. Whenever the direct memory access unit stores data in a cacheable location of external memory, a coherency problem is created if copy data for that location was already stored in the data cache unit and the corresponding copy data in the data cache unit is not updated.

Both a direct memory access unit and a data cache unit can provide significant performance advantages for a microprocessor. Therefore, a method and apparatus for circumventing the thrashing and coherency problems of implementing a direct memory access unit and a data cache unit together in the same system or microprocessor is needed.

SUMMARY OF THE INVENTION

The present invention is drawn to a system, apparatus and method using a direct memory access unit and a data cache unit in a microprocessor. As such the microprocessor of the present invention includes a central processing unit, a direct memory access unit, a data cache unit, and a bus control unit.

The central processing means is coupled to a local bus and processes data and instructions. The direct memory access means is coupled to the central processing unit and specifies loads and stores of data. The bus control means is coupled to the local bus and to the system bus and controls the transfer of data on a system bus.

The data cache means is coupled to the local bus and stores a plurality of copy data and a corresponding plurality of address tags. The plurality of copy data corresponds to a plurality of original data stored in a plurality of memory locations. During a memory access the data cache means receives a memory address from the local bus.

The microprocessor of the present invention further includes an invalidating means for invalidating at least one of the plurality of copy data in said data cache means. The invalidating means is invoked when the direct memory access means stores a new datum to at least one of the plurality of memory locations.

In addition, the microprocessor of the present invention includes a making non-cacheable means that makes load operations by said direct memory access means non-cacheable.

DETAILED DESCRIPTION OF THE INVENTION

A method and apparatus for using a direct memory access unit and a data cache unit together in a microprocessor or microprocessor system is described. In the following description, numerous specific details are set forth, such as types and sizes of data cache, and external memory configurations, in order to provide a thorough understanding of the present invention. It will be apparent, however, to one skilled in the art that the present invention may be practiced without these specific details. In other instances, well-known methods and circuits are not described in detail in order not to obscure the present invention. It is understood that the present invention is comprised of transistor circuits that are readily manufacturable using well known CMOS (complimentary metal-oxide semiconductor) technology.

The present invention addresses two inherent problems of implementing a data cache unit and a direct memory access unit together in a microprocessor: 1) thrashing of the data cache unit by the direct memory access unit and 2) cache coherency. In discussing the operation of a data cache unit and a direct memory access unit in a microprocessor system, the type of data access and the type of process transferring the data are important. The two basic types of data accesses are load (LD) and store (ST). A load is when data contained in external memory is requested by the CPU on the microprocessor chip. A store is when the CPU on the microprocessor chip stores data to external memory. The two basic types of processes that transfer data are USER and DMA. A USER access is one performed at the request of a user program by the central processing unit of the microprocessor. A DMA access is one requested by the direct memory access unit. With this terminology defined, the method and apparatus of the present invention for addressing the problems of thrashing and coherency when implementing a direct memory access unit and a data cache unit together in a microprocessor are now discussed.

Overall Design of the Preferred Embodiment of the Present Invention

Figure 2:
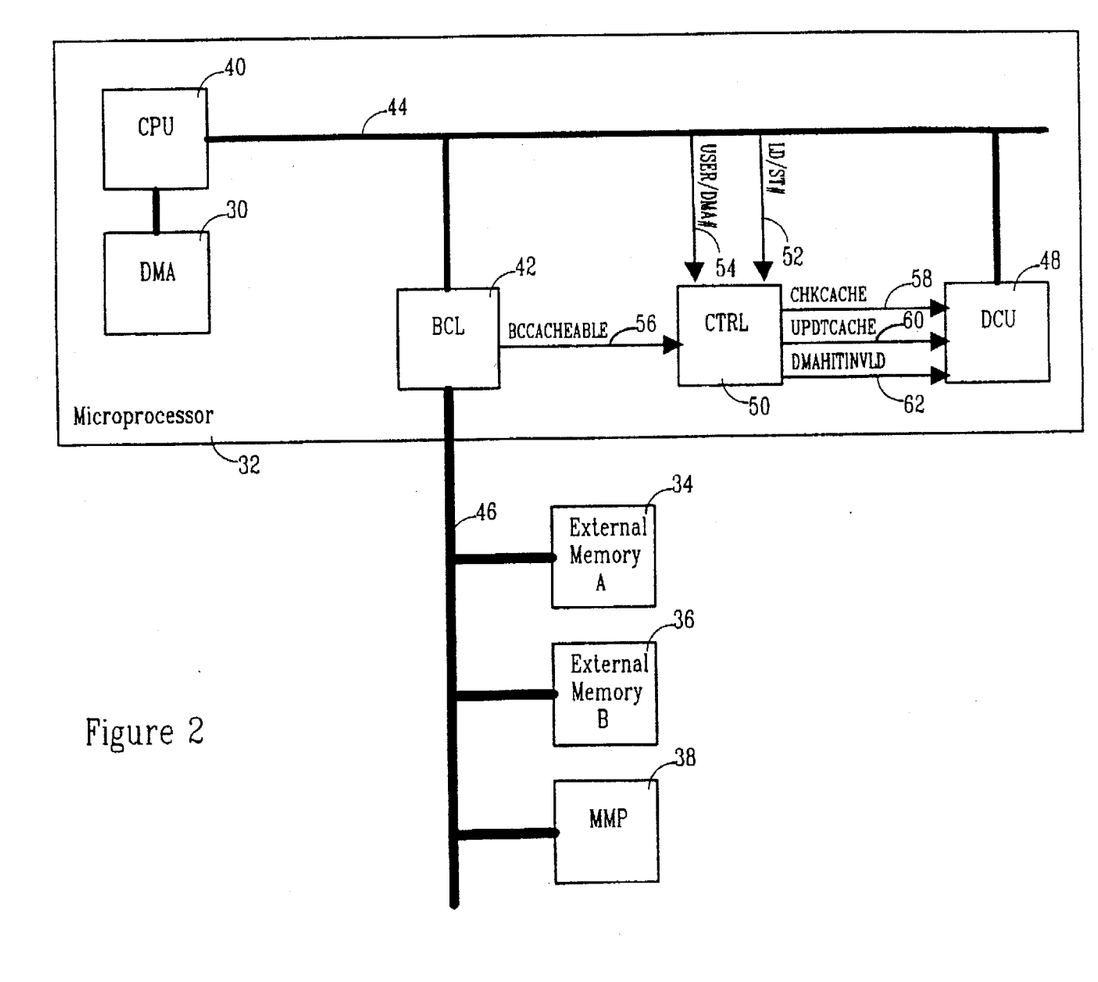
FIG. 2 is general block diagram of the preferred embodiment of the present invention illustrating a microprocessor having a central processing unit, a direct memory access unit, a data cache unit, a control block, and a bus control unit as implemented in a system with external memory and a memory mapped peripheral.

FIG. 2 illustrates a block diagram of the preferred embodiment of the present invention. Microprocessor 32 comprises a central processing unit (CPU) 40, a bus control unit (BCL) 42, and a data cache unit (DCU) 48 all coupled to a local bus 44. A direct memory access unit (DMA) 30 is coupled to central processing unit 40. Control block (CTRL) 50 receives a LD/ST# signal 52 and a USER/DMA# signal 54 from central processing unit 40 via local bus 44. LD/ST# signal 52 indicates a LD (load) operation when asserted high and a ST (store) operation when asserted low. Likewise, USER/DMA# indicates a USER access when asserted high and a DMA access when asserted low. Control block 50 also receives a BCCACHEABLE signal 56 from bus control unit 42. Bus control unit 42 asserts BCCACHEABLE signal 56 high to indicate that it considers an access to a given external memory location to be cacheable and low to indicate that it considers the access to be non-cacheable. In response to the LD/ST#, USER/DMA#, and BCCACHEABLE signals, control block 50 generates a CHKCACHE signal 58, a UPDTCACHE signal 60, and a DMAHITINVLD signal 62 for controlling the operation of data cache unit 48. CHKCACHE signal 58, UPDTCACHE signal 60, and DMAHIT-INVLD signal 62 being asserted high cause data cache unit 48 to perform a check cache operation, an update cache operation, and a DMA "HIT" invalidate operation, respectively. Bus control unit 42 is coupled to a system bus 46 for transferring data to and from external memory A 34, external memory B 36, and memory mapped peripheral 38 in response to direct memory access unit 30 and central processing unit 40. It is understood control block 50 can be readily implemented as part of data cache unit 48, rather than as a separate block, without affecting the operation of the present invention.

In the preferred embodiment, the data cache unit memory array is a 1 kilobyte, direct-mapped, write through cache. The cache memory array is organized in 64 lines consisting of 16 bytes each. Each line of the data comprises four words of four bytes each, each word having a corresponding valid bit to indicate whether the corresponding word is valid. Data cache unit 48 also includes a 64 entry tag ram array with a corresponding valid bit for each entry. Each entry of the tag ram array is 22 bits wide. A 32-bit address (ADDR[31:0] meaning bits 31 through 0 of address ADDR) is used to access data cache unit 48. The lower 10 bits of the address (ADDR[9:0]) are used to determine which byte is being accessed by decoding one of 64 lines, then one of four words in the line. The upper 22 bits (ADDR[31:10]) of the 32-bit address are compared with the tag corresponding to the selected line to determine whether a matching entry is stored in data cache unit 48.

Data cache 48 comprises logic for performing a check cache operation in response to CHKCACHE signal 58. It is understood that other signals or conditions can cause data cache unit 48 to perform either all or part of the steps of the cache check operation. The check cache operation includes performing a tag match by comparing the upper 22 bits of the address (ADDR[31:10]) with the tag entry corresponding to the line specified by the lower 10 address bits (ADDR[9:4]). A "hit" condition occurs when the tag matches ADDR[31:10]; a "miss" condition occurs when the tag and ADDR[31:10] do not match. Upon a cache hit, data cache unit 48 indicates a hit condition and retrieves the matching data onto local bus 44. Upon a cache miss, data cache unit 48 indicates a miss condition and waits for bus control unit 42 to retrieve the data from external memory and, subsequently, stores a copy of the data and corresponding address tag in the cache memory array and tag ram array, respectively.

Data cache unit 48 further comprises logic for performing an update cache operation in response to UPDTCACHE signal 60. It is understood that other signals or conditions can cause data cache unit 48 to perform either all or part of the steps of the update cache operation. The update cache operation includes writing a copy of the update data into the cache memory array and the corresponding tag address into the tag ram array.

In addition, data cache unit 48 comprises logic for performing a DMA "HIT" invalidate operation in response to DMAHITINVLD signal 62. It is understood that other signals or conditions can cause data cache unit 48 to perform either all or part of the steps of the DMA "HIT" invalidate operation. The DMA "HIT" invalidate operation comprises performing a tag match (same mechanism as for "CHKCACHE") and invalidating the cache data corresponding to a cache hit by clearing the valid bit(s) of the appropriate word(s).

Figure 3:
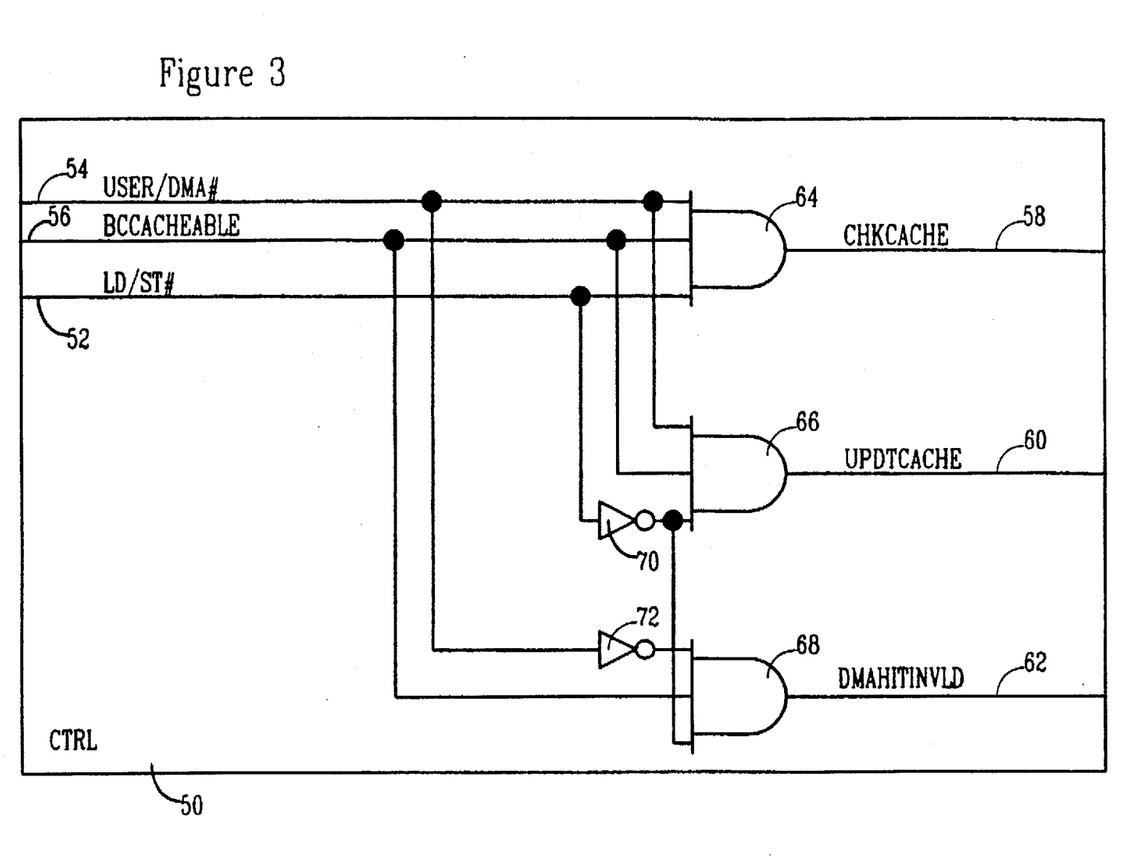
FIG. 3 illustrates the preferred embodiment of the control block for the data cache unit.

FIG. 3 shows the preferred embodiment of the logic implementation control block 50. AND device 64 generates CHKCACHE signal 58 in response to USER/DMA# signal 54, BCCACHEABLE signal 56, and LD/ST# signal 52. NOT device 70 receives LD/ST# signal 52 as an input. AND device 66 generates UPDTCACHE signal 60 in response to USER/DMA# signal 54, BCCACHEABLE signal 56, and the output of NOT device 70. NOT device 72 receives USER/DMA# signal 54 as an input. AND device 68 generates DMAHITINVLD signal 62 in response to the output of NOT device 72, BCCACHEABLE signal 56, and the output of NOT device 70.

A summary of the operations performed by the data cache unit in response to the possible LD, ST, USER, and DMA combinations of the present invention is shown in Table I. Each case, except DMA ST, assumes that BCCACHEABLE signal 56 is asserted high. In other words, except in the case of a DMA ST access, data cache unit 48 will not perform any operation if bus control unit 42 indicates that the access is to a non-cacheable region of memory.

TABLE I

Data Cache Operations for combinations of LD/ST and USER/DMA access.

| | USER | DMA |
|---|---|---|
| LD | CHKCACHE signal 58 active high:<br>Perform check cache operation.<br>1. Perform tag match operation;<br>2. On cache hit, retrieve cache data;<br>3. On cache miss, write a copy of data retrieved from external memory into the cache. | No Action: (DCU does nothing)<br>DMA loads are treated as non-cacheable. |
| ST | UPDTCACHE signal 60 asserted high:<br>Perform cache update operation.<br>1. Write a copy of data into the cache. | Two options, either:<br>DMAHITINVLD signal asserted high:<br>(This is the preferred option)<br>Perform DMA "HIT" invalidate operation.<br>1. Perform tag match;<br>2. On cache hit, invalidate the corresponding cache data.<br>or<br>Perform DMA ST cache update operation.<br>1. Perform a tag match operation;<br>2. On a cache hit, write a copy of the data into the data cache. |

The present invention allows normal data cache unit operation for LD and ST accesses by USER. DMA accesses are treated differently to solve the thrashing and coherency problems. The four possible types of accesses (USER LD, USER ST, DMA LD, and DMA ST) are now discussed.

USER LD. A USER LD access presents no conflict problem between the direct memory access unit and the data cache unit. Therefore, the present invention preserves normal data cache unit operation for a USER LD access. Referring to FIG. 2, during a USER LD access, central processing unit 40 asserts USER/DMA# signal 54 high and LD/ST# signal 52 high. Bus control unit 42 asserts BCCACHEABLE signal 56 high if the LD access is to a cacheable region of memory. The cacheability of a region of memory is determined in bus control unit 42 by values stored in a region table. Individual entries in the region table correspond to segments of memory. Features such as cacheability are programmable for each segment of memory by changing the values in the corresponding entry in the region table. In response to USER/DMA# signal 54 being high, BCCACHEABLE signal 56 being high, and LD/ST# signal 52 being high, control block 50 asserts CHKCACHE signal 58 high. CHKCACHE signal 58 high causes data cache unit 48 to perform a cache check operation comprising the three steps of: 1) perform a tag match operation; 2) on a cache hit, retrieve the cache data for use by USER, and 3) on a cache miss, write a copy of data retrieved from external memory by bus control unit 42 into the data cache unit.

The operation of control block 50 in the USER LD case is understood by referring to FIG. 3. USER/DMA# signal 54 being high, BCCACHEABLE signal 56 being high, and LD/ST# signal 52 being high cause AND device 64 to assert CHKCACHE signal 58 high, AND device 66 to assert UPDTCACHE signal 60 low, and AND device 68 to assert DMAHITINVLD signal 62 low.

USER ST. A USER ST access presents no conflict problem between the direct memory access unit and the data cache unit. Therefore, the present invention also preserves normal data cache unit operation for a USER ST access. Referring to FIG. 2, during a USER ST access, central processing unit 42 asserts USER/DMA# signal 54 high and LD/ST# signal 52 low. Bus control unit 42 asserts BCCACHEABLE signal 56 high if the access is to a cacheable region of memory. In response to USER/DMA# signal 54 being high, BCCACHEABLE signal 56 being high, and LD/ST# signal 52 being low, control block 50 asserts UPDTCACHE signal 60 high. UPDTCACHE signal 60 high causes data cache unit 48 to perform a cache update operation which comprises writing a copy of the data being written into the data cache unit.

The operation of control block 50 in the USER ST case is understood by referring to FIG. 3. USER/DMA# signal 54 being high, BCCACHEABLE signal 56 being high, and LD/ST# signal 52 begin low cause AND device 64 to assert CHKCACHE signal 58 low, AND device 66 to assert UPDTCACHE signal 60 high, and AND device 68 to assert DMAHITINVLD signal 62 low.

DMA LD. Thrashing of the data cache unit by the direct memory access unit is the problem that is encountered during a DMA LD access. The present invention overcomes the thrashing problem by making all DMA LD accesses non-cacheable. Referring to FIG. 2, during a DMA LD access central processing unit 40 asserts USER/DMA# signal 54 low and LD/ST# signal 52 high. In response to USER/DMA# signal 54 being low and LD/ST# signal 52 being high, control block 50 asserts CHKCACHE signal 58 low, UPDTCACHE signal 60 low, and DMAHITINVLD signal 62 low. Note that the value of BCCACHEABLE signal 56 is irrelevant. CHKCACHE signal 58 being low, UPDTCACHE signal 60 being low, and DMAHITINVLD signal 62 being low causes data cache unit 48 to ignore a DMA LD data access, thereby affecting the non-cacheability of DMA LD accesses. In this way the present invention prevents the direct memory access unit 30 from thrashing the data cache unit 48 during DMA LD accesses.

The operation of control block 50 in the DMA LD case is understood by referring to FIG. 3. USER/DMA# signal 54 being low and LD/ST# signal 52 being low cause AND device 64 to assert CHKCACHE signal 58 low, AND device 66 to assert UPDTCACHE signal 60 low, and AND device 68 to assert DMAHITINVLD signal 62 low.

DMA ST. Cache coherency is the problem that is encountered during a DMA ST access. The present invention overcomes this problem in one of two ways: 1) perform a tag match operation followed by writing a copy of the DMA ST data into the data cache unit on a cache hit, or 2) perform a tag match operation followed by an invalidate cache data operation on a cache hit. The preferred embodiment of the present invention utilizes the second option to solve the cache coherency problem for reasons that will be discussed.

Option 1. One way to solve the cache coherency problem is to write the data to the data cache unit on every DMA ST access. However, this approach introduces undesirable thrashing of the data cache unit. A better solution that solves the coherency problem without introducing thrashing problems is to perform a tag match to determine if a copy of the data in the location to be written to by the DMA ST exists in the data cache unit, and if so, replace that copy with a new copy of the DMA ST data. This solution does not introduce a thrashing problem because it will only update "now stale" memory locations already copied into the data cache unit. However, this solution requires enough time in the microprocessor pipeline to perform both the tag match and subsequently write the new copy data into the data cache memory. This embodiment of the present invention was not used in the currently preferred embodiment of the present invention due to microprocessor pipeline timing constraints.

Option 2. Referring to FIG. 2, during a DMA ST access, central processing unit 40 asserts USER/DMA# signal 54 low and LD/ST# signal 52 low. Bus control unit 42 asserts BCCACHEABLE signal 56 high if the access is to a cacheable region of memory. In response to USER/DMA# signal 54 being low, BCCACHEABLE signal 56 being high, and LD/ST# signal 52 being low, control block 50 asserts DMAHITINVLD signal 62 high. DMAHITINVLD signal 62 high causes data cache unit 48 to perform an invalidate cache data operation which comprises performing a tag match followed by invalidating the corresponding cache data on a cache hit.

The operation of control block 50 in the DMA ST case is understood by referring to FIG. 3. USER/DMA# signal 54 being low, BCCACHEABLE signal 56 being high, and LD/ST# signal 52 being low cause AND device 64 to assert CHKCACHE signal 58 low, AND device 66 to assert UPDTCACHE signal 60 low, and AND device 68 to assert DMAHITINVLD signal 62 high.

Operation of the Preferred Embodiment of the Present Invention

Figure 5:
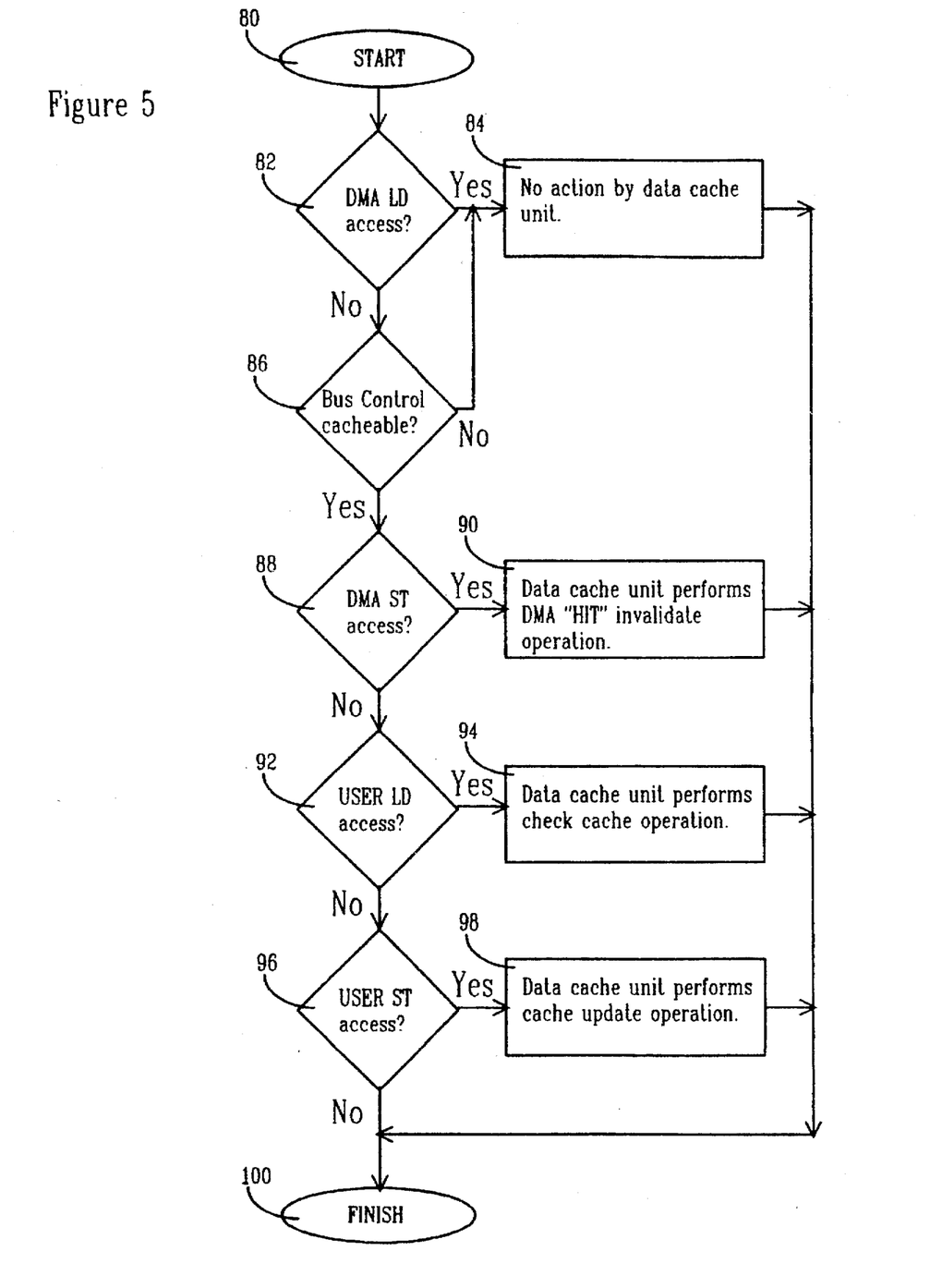
FIG. 5 is a flowchart of the method of the preferred embodiment of the present invention.

The major functions of the preferred embodiment of the present invention operate according to the flow diagram illustrated in FIG. 5. The present invention acts to: 1) preclude the data cache unit from any action in response to a DMA LD access, 2) perform an invalidate cache data operation in response to cache hit on a DMA ST access, and 3) treat USER LD and USER ST accesses normally.

As shown in FIG. 5, at step 80 the functions of the present invention begin when either central processing unit 40 or direct memory access unit 30 of microprocessor 32 starts a data access to external memory. Central processing unit 40 determines the type of access, the unit performing the access, and the location being accessed and drives the USER/DMA# 54 and LD/ST# 52 signals accordingly. Bus control unit 42 determines whether the external memory access is to a cacheable region of memory and asserts BCCACHEABLE 56 accordingly. In step 82, control block 50 determines whether a DMA LD access is being performed by checking whether the USER/DMA# 54 and LD/ST# 52 signals are low and high, respectively. If a DMA LD is detected, then no action is taken by data cache unit 48 as indicated in step 84; otherwise the method proceeds to step 86. In step 86, control block 50 determines whether the external memory location being accessed is considered cacheable by bus control unit 42 by checking whether BCCACHEABLE signal 56 is asserted high. If BCCACHEABLE signal 56 is not asserted high, then no action is taken by data cache unit 48 as indicated in step 84; otherwise the method proceeds to step 88. In step 88, control block 50 determines whether a DMA ST access is being performed by checking for low, high, low on USER/DMA# 54, BCCACHEABLE 56, and LD/ST# 52 signals, respectively. If a DMA ST access is detected, then data cache unit 48 performs a DMA "HIT" invalidate operation as indicated in step 90; otherwise the method proceeds to step 92. In step 92, control block 50 determines whether a USER LD access is being performed by checking for high, high, high on USER/DMA# 54, BCCACHEABLE 56, and LD/ST# 52 signals, respectively. If a USER LD access is detected, then data cache unit 48 performs a check cache operation as indicated in step 94; otherwise the method proceeds to step 96. In step 96, control block 50 determines whether a USER ST access is being performed by checking for high, high, low on USER/DMA# 54, BCCACHEABLE 56, and LD/ST# 52 signals, respectively. If a USER ST access is detected, then data cache unit 48 performs a cache update operation as indicated in step 98; otherwise the method proceeds to step 100 where the process ends. The data cache operations in steps 84, 90, 94, and 98 all proceed to finishing step 100 upon completion.

Overall System and Environment of the Present Invention

Figure 4:
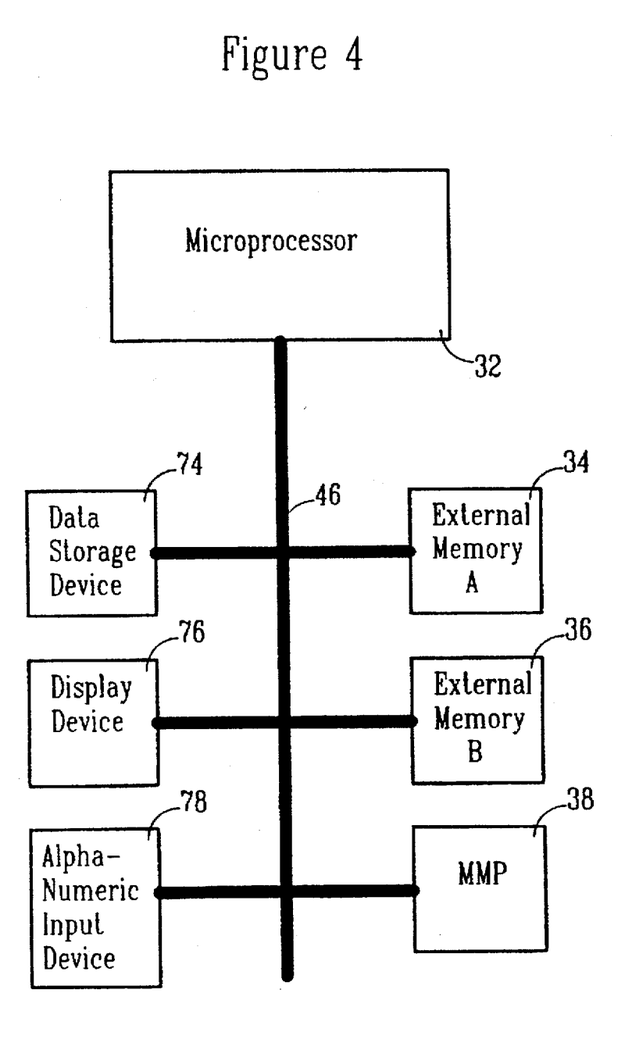
FIG. 4 illustrates a block diagram of one overall system embodiment of the present invention microprocessor.

The overall environment, or system, in which the preferred embodiment operates is now described. In general, the preferred the preferred embodiment of the present invention is used in digital computer systems comprising, as illustrated in FIG. 4, a system bus 46 for communicating information between the elements of the system, a microprocessor 32 coupled to system bus 46 for processing information and instructions, external memory A 34 and external memory B 36 coupled to system bus 46 where the memories can be either random access memory for storing information and instructions for the microprocessor or read only memory for storing static information and instructions for microprocessor 32, a data storage device 74 such as a magnetic disk and disk drive coupled with system bus 46 for storing program information and instructions, a display device 76 coupled to the system bus 46 for displaying information to the computer user, an alphanumeric input device 78 coupled to the system bus 46 for communicating information and command selections to microprocessor 32, and a memory mapped peripheral device 38 such as a serial input/output device for allowing microprocessor 32 to communicate with serial devices. It is understood that some environments of the present invention may contain all or merely a portion of the above components.

Thus, a method and apparatus for using a direct memory access unit and a data cache unit together in a microprocessor has been described.

What is claimed is:

1. A microprocessor, comprising:
    central processing means for processing data and instructions, said central processing means being coupled to a local bus;

direct memory access means for loading and storing data to a first and second plurality of memory locations contained in a memory, said direct memory access means being coupled to said central processing means;

bus control means for loading and storing data on a system bus, said bus control means being coupled to the local bus and for servicing memory accesses from both direct memory access means and central processing means to the system bus, the system bus for transferring data external to said microprocessor, said central processing means causing said bus control means to transfer data on the system bus, said bus control means acting as a single bus master to said system bus;

data cache means coupled to the local bus for selectively storing a copy of data loaded by said bus control means, said data cache means storing a plurality of copy data and a corresponding plurality of address tags, the plurality of copy data corresponding to a plurality of original data stored in the second plurality of memory locations, said data cache means receiving a memory address from the local bus during a memory access by one of said central processing means and said direct memory access means;

updating means for selectively updating to said data cache means at least one of the plurality of copy data in said data cache means when said direct memory access means stores new data to at least one of the second plurality of memory locations, wherein said updating means detects a store by said direct memory access means to one of the second plurality of memory locations by comparing the memory address with at least one of the corresponding plurality of address tags to determine if a matching address tag exists; and non-cacheable designation means for dynamically designating loads by said direct memory access means which were previously designated as cacheable by said bus control means as temporarily non-cacheable during the loads by said direct memory access means.

2. The microprocessor of claim 1 wherein said updating means updates a first copy data when a matching address tag exists, the first copy data corresponding to the matching address tag.

3. The microprocessor of claim 2 wherein said data cache means also stores a plurality of valid bits equally corresponding to the plurality of copy data, the first copy data being invalidated by clearing the corresponding valid bit.

4. A microprocessor, comprising:

central processing means for processing data and instructions, said central processing means being coupled to a local bus;

direct memory access means for loading and storing data to a first plurality of memory locations contained in a memory, said direct memory access means being coupled to said central processing means;

bus control means for loading and storing data on a system bus, said bus control means being coupled to the local bus and to the system bus for servicing memory accesses from both direct memory access means and said central processing means, the system bus for transferring data external to said microprocessor, said central processing means causing said bus control means to transfer data on the system bus, said bus control means acting as a single bus master to said system bus;

data cache means coupled to the local bus for selectively storing a copy of data loaded by said bus control means, said data cache means storing a plurality of copy data and a corresponding plurality of address tags, the plurality of copy data corresponding to a plurality of original data stored in a second plurality of memory locations contained in said memory, said data cache means receiving a memory address from the local bus during a memory access by one of said central processing means and said direct memory access means; and non-cacheable designation means for dynamically designating loads by said direct memory access means which were previously designated as cacheable by said bus control means as temporarily non-cacheable during the loads by said direct memory access means.

5. A microprocessor, comprising:

a central processing unit coupled to a local bus for processing data and instructions;

a direct memory access unit coupled to said central processing unit for loading and storing data to a first and second plurality of memory locations contained in a memory;

a bus control unit coupled to the local bus and to a system bus for servicing memory accesses from both said direct memory access unit and said central processing unit and for loading and storing data on the system bus, the system bus for transferring data external to said microprocessor, said central processing unit causing said bus control unit to transfer data on the system bus, said bus control unit acting as a single bus master to said system bus;

a data cache unit coupled to the local bus for selectively storing a copy of data loaded by said bus control unit, said data cache unit storing a plurality of copy data and a corresponding plurality of address tags, the plurality of copy data corresponding to a plurality of original data stored in the second plurality of memory locations, said data cache unit receiving a memory address from the local bus during a memory access by one of said central processing unit and said direct memory access unit, said data cache unit including a tag match means for determining whether said memory access is to one of the first and second plurality of memory locations, said data cache unit also including an update means for selectively updating the plurality of copy data to said data cache unit; and a control block coupled to said bus control unit, said data cache unit, and said central processing unit for detecting when said memory access is a store by said direct memory access unit, said control block causing said data cache unit to selectively update at least one of the plurality of copy data when said memory access is a store by the direct memory access unit to one of the second plurality of memory locations, and wherein said control block detects when said memory access is a load by said direct memory access unit, said control block causing the load by said direct memory access unit which was previously designated as cacheable by said bus control means to be temporarily designated as non-cacheable during the load by said direct memory access unit.

6. The microprocessor of claim 5 wherein the tag match means of said data cache unit determines whether the access is to one of the second plurality of memory locations by comparing the memory address with at least one of the corresponding plurality of address tags to determine if a matching address tag exists.

7. The microprocessor of claim 6 wherein the update means of said data cache unit updates a first copy data when a matching address tag exists, the first copy data corresponding to the matching address tag.

8. The microprocessor of claim 7 wherein said data cache unit also stores a plurality of valid bits equally corresponding to the plurality of copy data, the update means updating the first copy data by clearing the corresponding valid bit.

9. A computer system comprising:

a) system bus means for providing a common communication pathway; memory storage means coupled to said system bus for storing a plurality of original data, said memory storage means storing the plurality of original data in a plurality of memory locations; and b) microprocessor means coupled to said system bus for executing a plurality of instructions, said microprocessor comprising:

central processing means for processing data and instructions, said central processing means being coupled to a local bus;

direct memory access means for loading and storing data to said memory storage means, said direct memory access means being coupled to said central processing means;

bus control means for controlling the transfer of data on said system bus, said bus control means being coupled to the local bus and to said system bus for servicing memory accesses from both said direct memory access means and said central processing means, said bus control means acting as a single bus master to said system bus;

data cache means coupled to the local bus for storing a plurality of copy data and a corresponding plurality of address tags, the plurality of copy data corresponding to the plurality of original data stored in said memory storage means, said data cache means receiving a memory address from the local bus during a memory access to said memory storage means; and updating means for selectively updating at least one of the plurality of copy data in said data cache means when said direct memory access means stores a new data to at least one of the plurality of memory locations in said memory storage means, wherein said updating means detects a store by said direct memory access means to one of the plurality of memory locations by comparing the memory address with at least one of the plurality of address tags to determine if a matching address tag exists; and non-cacheable designation means for dynamically designating loads by said direct memory access means which were previously designated as cacheable by said bus control means as temporarily non-cacheable during the loads by said direct memory access means.

10. The computer system of claim 9 wherein said updating means updates a first copy data when a matching address tag exists, the first copy data corresponding to the matching address tag.

11. The computer system of claim 10 wherein said data cache means also stores a plurality of valid bits equally corresponding to the plurality of copy data, the first copy data being invalidated by clearing the corresponding valid bit.

12. A computer system comprising:

a) a system bus for providing a common communication pathway; a memory storage device coupled to said system bus for storing a plurality of original data, said memory storage device storing the plurality of original data in a plurality of memory locations; and b) a microprocessor coupled to said system bus for executing a plurality of instructions, said microprocessor comprising;

a central processing unit coupled to a local bus for processing data and instructions;

a direct memory access unit coupled to said central processing unit for loading and storing data;

a bus control unit coupled to the local bus and to said system bus for servicing memory accesses from both said central processing unit and direct memory access unit for controlling the transfer of data on said system bus, said bus control unit acting as a single bus master to said system bus;

a data cache unit coupled to the local bus for storing a plurality of copy data and a controlling plurality of address tags, the plurality of copy data corresponding to a plurality of original data stored in a plurality of memory locations, said data cache unit receiving a memory address from the local bus during a memory access, said data cache unit including a tag match means for determining whether the memory access is to one of the plurality of memory locations, said data cache unit also including an update means for selectively updating the plurality of copy data; and a control block coupled to said bus control unit, said data cache unit, and said central processing unit for detecting when the memory access is a store by said direct memory access unit; said control block causing said data cache unit to update at least one of the plurality of copy data when the access is a store by the direct memory access unit to one of the plurality of memory locations, and wherein said control block detects when said memory access is a load by said direct memory access unit, said control block causing the load by said direct memory access unit which was previously designated as cacheable by said bus control means to be temporarily designated as non-cacheable during the load by said direct memory access unit.

13. The computer system of claim 12 wherein the tag match means of said data cache unit determines whether the access is to one of the plurality of memory locations by comparing the memory address with at least one of the plurality of address tags to determine if a matching address tag exists.

14. The computer system of claim 13 wherein the update means of said data cache unit updates a first copy data when a matching address tag exists, the first copy data corresponding to the matching address tag.

15. The computer system of claim 14 wherein said data cache unit also stores a plurality of valid bits equally corresponding to the plurality of copy data, the update means updating the first copy data by clearing the corresponding valid bit.

16. A method for using a data cache unit and a direct memory access unit in a microprocessor, comprising the steps of:

accessing an external memory location containing original data, the external memory location being external to the microprocessor;

preventing action by the data cache unit if said accessing is a load by the direct memory access unit; and updating a copy data in the data cache if said accessing is a store by the direct memory access unit and the copy data corresponds to the original data in the external memory location.

17. The method of claim 16, further comprising the steps of:

preventing action by the data cache unit if the external memory location is non-cacheable;

retrieving the copy data in the data cache if said accessing is a load by a central processing unit of the microprocessor and the copy data corresponds to the original data in the external memory location; and writing a new copy data to the cache if said accessing is a store by the central processing unit.

* * * * *